United States Patent [19]

Shmoldas

[11] Patent Number: 5,787,842
[45] Date of Patent: Aug. 4, 1998

[54] RESTRICTIVE PET COLLAR

[76] Inventor: John D. Shmoldas, 3996 Corte Cancion, Thousand Oaks, Calif. 91360

[21] Appl. No.: 910,362

[22] Filed: Aug. 13, 1997

[51] Int. Cl.$^6$ ............................................. A01K 27/00
[52] U.S. Cl. ............................................................ 119/856
[58] Field of Search .............................. 119/856, 858, 119/862, 865, 174, 850

[56] References Cited

U.S. PATENT DOCUMENTS

| | | | |
|---|---|---|---|
| 180,518 | 8/1876 | Armintrout . | |
| 205,515 | 7/1878 | Van Culin . | |
| 243,409 | 6/1881 | Speer | 119/863 X |
| 397,722 | 2/1889 | Herrin | 119/862 X |
| 485,630 | 11/1892 | Hull | 119/862 X |
| 2,810,368 | 10/1957 | McCombe . | |
| 2,989,030 | 6/1961 | Draheim | 119/106 |
| 2,998,008 | 8/1961 | Klesa . | |
| 3,013,530 | 12/1961 | Zeman | 119/106 |
| 3,036,554 | 5/1962 | Johnson | 119/96 |
| 3,072,098 | 1/1963 | Boemle | 119/106 |
| 4,413,588 | 11/1983 | Lindholm | 119/106 |

*Primary Examiner*—Thomas Price

[57] ABSTRACT

An improved restrictive pet collar comprising a base (12) of strong semi-rigid material, such as leather or heavy plastic, which is adjustable attached to a pet by a fastener (14), together with a plurality of restraining members (16) projecting radially outward from the base (12) attached with attachment screws (18) at numerous locations about the side and upper portions of the base. The pet restrictive collar is oriented to preclude a pet from passing through narrow openings, from burrowing under fencing, or from chewing or scratching areas under medical treatment while allowing good pet mobility, visibility, and comfort.

14 Claims, 1 Drawing Sheet

RESTRICTIVE PET COLLAR

BACKGROUND

1. Field of the Invention

The restrictive pet collar relates to pet equipment and is particularly directed to improved pet collars which serve to prevent pets from squeezing through small openings, digging under fences and from chewing or scratching injured head and body regions.

2. Description of Prior Art

It is well known that dogs, cats, rabbits and other pets are often made to wear collars to enable attachment of license tags, leashes, and harnesses to restrict mobility and large disk shaped collars to prevent chewing of injured areas under medical treatment. There has also been many various pet barriers available such as electric shock collars, small grid fencing, cable runs that leashed pets are attached to and like items designed to confine a pet to a given area or specialized collars that restrict the pet's movement and access to its own body areas. It is well known that many pets will attempt to escape fenced areas by squeezing through small openings or by burrowing under the barriers. Likewise, pets are known to scratch or chew injured areas further aggravating wounds and precluding effective medical treatment. It has been common practice to use collars with wide radially extended flanges such as Lindholm's U.S. Pat. No. 4,413,588 which serve as restraining devices however these flanges are often quite heavy, which places an unnecessary burden on the neck and shoulder muscles of the pet. Also these wide radial flanges such as F. L. Johnson's U.S. Pat. No. 3,036,554 restrict visibility to the side and rear and significantly increase the pet's insecurity and anxiety. Furthermore, many of the prior art pet restraint collars such as W. A. Boemle's U.S. Pat. No. 3,072,098 and W. V. Zeman's U.S. Pat. No. 3,013,530 are uncomfortable and preclude pets from achieving a normal sleeping or resting position. In addition, many of the previous designs such as Von Culins Pat. No. 205,515 and J. A. Armentrout's Pat. No. 180,518 are inflexible and are hazardous to other pets, their handlers, furniture or garden plants. These collars which utilize large radial flanges are expensive, difficult to manufacture, and require considerable maintenance to keep in safe working order. Each of the prior art references is subject to the disadvantages discussed above. Thus, none of the prior art pet restrictive collars has been entirely satisfactory.

OBJECTS AND ADVANTAGES

The above disadvantages of the prior art are overcome with the present invention. Accordingly, several objects and advantages of the present invention are that an improved pet restrictive collar is provided that is comfortable, simple to use, does not restrict play or resting, provides good side and rear hemisphere visibility, is safe to other animals and environment, yet which effectively prevents pets from squeezing through narrow spaces or aggravating their own irritated head or posterior body regions under medical treatment.

These advantages of the present invention are preferably attained by providing an improved pet restrictive collar comprising a strip of semi-rigid material, such as leather, metal reinforced fiber, or stiff plastic, which is adjustably securable about the neck of a pet, together with a plurality of restraint members projecting radially outward from the strip at numerous locations about the side and upper portions of the strip and balanced by a selection of material and fastener weights and geometry to assist in maintaining the collar in a desired orientation.

Accordingly, it is an object of the present invention to provide an improved pet restrictive collar that precludes pets from passing through narrow openings in fences or burrowing under barriers.

Another object is to provide an improved pet restrictive collar which effectively prevents a pet from biting, chewing, or scratching its own irritated body areas or areas under medical treatment Another object of the present invention is to provide an improved pet restrictive collar which is comfortable and provides good all round visibility to the pet.

Another object of the present invention is to provide an improved restrictive collar which is simple in construction and inexpensive to produce and purchase.

A specific object of the present invention is to provide an improved pet restrictive collar comprising a strip or base of strong semi-rigid material such as leather, metal reinforced fiber, or stiff plastic, which is adjustably secured about the neck of a pet so as to be firmly, yet comfortably attached to the pet, together with a plurality of restraint members projecting radially outward from the base and having at least one fastener secured to the bottom portion of the base to assist in adjusting for fit and maintaining the collar in a desired orientation to prevent passage through narrow openings or access to chew or scratch injured own body or head areas.

Obviously, numerous variation and modifications can be made without departing from the spirit of the present invention. Therefore it should be clearly understood that the form of the present invention described above and shown in the figures of the accompanying drawings are illustrative and not intended to limit the scope of the invention. Still further objects and advantages will become apparent from a consideration of the ensuing description and accompanying drawing.

REFERENCE NUMERALS

Figure 1:
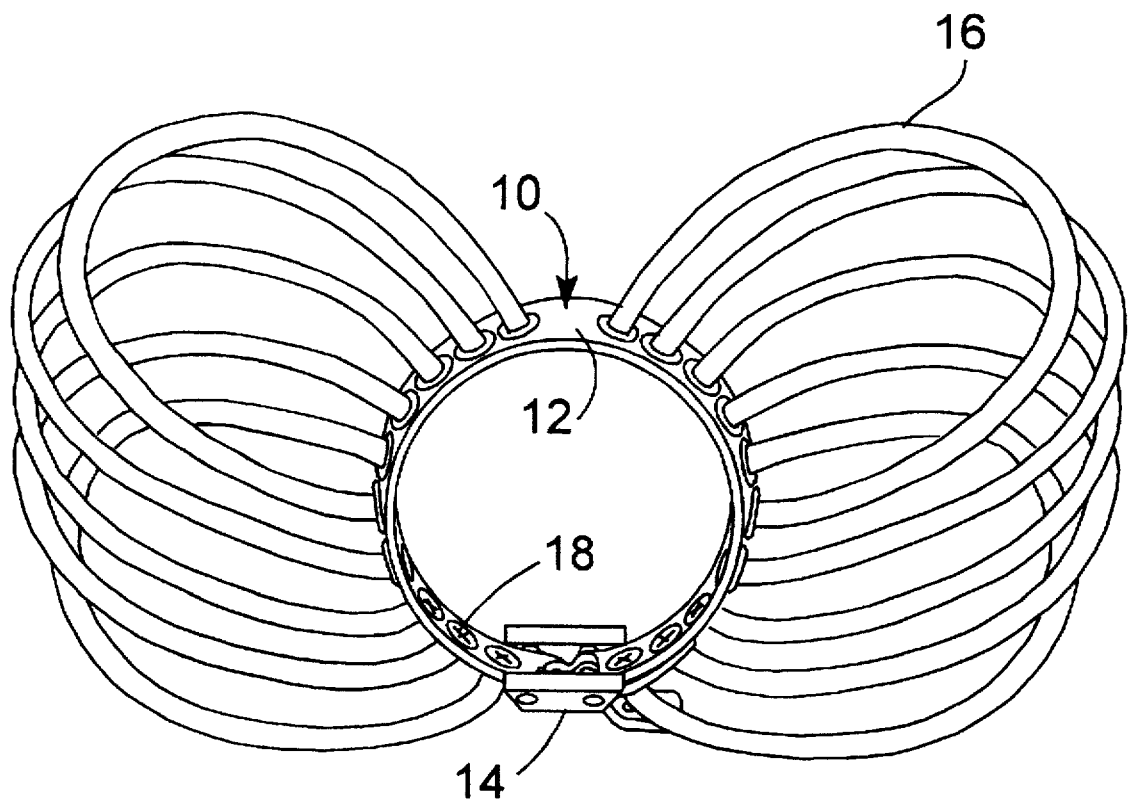
FIG. 1 is a perspective view of the restrictive pet collar.

10 Collar
12 Base
14 Fastener
16 Restraining Members
18 Attachment Screws

SUMMARY

A restrictive pet collar consisting of a strong base with an adjustable fastener, and multiple radially projecting semi-rigid restraining members attached to a base of semi-rigid material. The collar, when properly fitted and oriented, prevent a pet from passing through narrow openings and also from chewing or scratching areas under medical treatment.

PREFERRED EMBODIMENT—DESCRIPTION

That form of the present invention chosen for purposes of illustration in the drawing, FIG. 1, which shows the restrictive pet collar, indicated generally at 10, formed of a base 12, of strong, semi-rigid material, such as leather or stiff plastic, having means, such as a fastener 14, for reasonably and adjustably securing the base 12 about the neck of a pet, such as a dog, cat, rabbit or the like.

A plurality of rigid restraining members 16, are attached to the base 12, at each end by attachment screws 18. The restraining members 16, project radially outward from the base 12, and are interwoven with each other to provide additional rigidity. The attachment screws 18, provide a strong bond to the base 12, and a high degree of rigidity to the restraining members at the attachment point to the base 12. The restraining members 16, are more flexible at their maximum distance from the base 12, providing a means to engage a barrier, not shown, and when engaged to provide a degree of resistance that the pet cannot easily overcome. In a like manner, the retraining members 16, form a barrier preventing the pet from chewing or scratching posterior or head areas under medical treatment, if fitted for that purpose.

PREFERRED EMBODIMENT—OPERATION

In use, the collar 10 is secured around the neck of a pet, by means of fastener 14, and the collar is oriented so that the restraining members 16, project outwardly and upwardly. Should the pet attempt to squeeze through a narrow opening or burrow under a fence or the like, the restraining members will engage the adjacent surfaces, not shown, and will prevent the pet from escaping. However, since the restraining members 16 are flexible strips or tubes, air and water can pass freely between the restraining members 16 and will not interfere with the pets mobility or vision. At the same time, the restraining members 16 preclude the pet from scratching its head area or from chewing its posterior or back regions if fitted for that purpose. The collar is light weight and balanced to maintain its orientation during normal walking and running by the pet yet does not interfere with the pet's normal resting and sleeping positions.

CONCLUSIONS, RAMIFICATIONS, AND SCOPE

The pet restraining collar therefore effectively provides an inexpensive, highly mobile restraining device that prevents a pet from escaping through narrow fence openings or from burrowing under fencing and simultaneously the design provides for an effective medical collar, preventing a pet from chewing or scratching their own body or head area(s) under medical treatment.

Accordingly, it can be seen that obviously, numerous variations and modifications can be made without departing from the spirit of the present invention. For example, the number and size of the restraining members can be varied for various size and strength pets, the positions and length of the restraining members can be varied to improve performance with specific pets and barriers or to prevent access to specific injury locations. The weight of the restraining members and adjustment fastener can be varied to achieve balance and maintain the desired collar orientation. The pet restraint collar can be fitted with devices which cause physical discomfort to the pet when barriers are encountered to train the pet not to escape. Restraining members can be made wider to further reduce access to injured areas. The restrictive pet collar base can be made broader in width to further restrict neck movement and the pet's ability to reach injured posterior body regions. Colors or reflective materials can be used to enhance the detection and identification of the pet. Herefore it should be clearly understood that the form of the present invention described herein and shown in the figures of the accompanying drawing are illustrative only and are not intended to limit the scope of the present invention. Thus the scope of the invention should be determined by the appended claims and their legal equivalents, rather than by the examples given.

What is claimed is:

1. A restrictive pet collar comprising:

a base of strong semi-rigid material having sufficient length adapted to circumscribe a pet's neck, a releasable fastening means for adjustably securing said base about the neck of a pet to provide top, sides, and bottom portions of said base, a plurality of restraining members projecting radially outward from said base at numerous locations about the sides and top portions of said base wherein said restraining members have each end attached to said base, and a means of attaching said restraining members to said base.

2. The collar of claim 1 wherein:

said restraining members extend about 60–75 percent of the circumference of said base.

3. The collar of claim 1 wherein:

said restraining members are thin arcurate strips.

4. The collar of claim 1 wherein:

said restraining members are tubes.

5. The collar of claim 1 wherein:

said restraining members are interwoven.

6. The collar of claim 1 wherein:

said restraining members are made of rigid material.

7. The collar of claim 1 wherein the base and restraining members are formed as a single unit.

8. A restrictive pet collar comprising:

a base of strong semi-rigid material having sufficient length adapted to circumscribe a pet's neck, a releasable fastening means for adjustably securing said base about the neck of a pet to provide top, sides, and bottom portions of said base, a plurality of restraining members projecting radially outward from said base at numerous locations about the sides and top portions of said base wherein said restraining members have each end attached to said base, a means of attaching said restraining members to said base, and said base being weighted as a means to maintain the desired orientation.

9. The collar of claim 8 wherein:

said restraining members extend about 60–75 percent of the circumference of said base.

10. The collar of claim 8 wherein:

said restraining members are thin arcurate strips.

11. The collar of claim 8 wherein:

said restraining members are tubes.

12. The collar of claim 8 wherein:

said restraining members are made of rigid material.

13. The collar of claim 8 wherein:

said restraining members are interwoven.

14. The collar of claim 8 wherein the base and restraining members are formed as a single unit.

\* \* \* \* \*